(12) United States Patent
Souilmi

(10) Patent No.: US 8,155,912 B2
(45) Date of Patent: Apr. 10, 2012

(54) SENSOR NETWORK CALIBRATION

(75) Inventor: Younes Souilmi, Cagnes sur Mer (FR)

(73) Assignee: Accenture Global Services Limited, Dublin (IE)

( * ) Notice: Subject to any disclaimer, the term of this patent is extended or adjusted under 35 U.S.C. 154(b) by 192 days.

(21) Appl. No.: 12/595,773

(22) PCT Filed: Apr. 14, 2008

(86) PCT No.: PCT/EP2008/054471
§ 371 (c)(1),
(2), (4) Date: Jan. 12, 2010

(87) PCT Pub. No.: WO2008/125649
PCT Pub. Date: Oct. 23, 2008

(65) Prior Publication Data
US 2010/0121602 A1    May 13, 2010

(30) Foreign Application Priority Data

Apr. 17, 2007   (EP) ..................... 07300959

(51) Int. Cl.
*G06F 19/00* (2011.01)
(52) U.S. Cl. .......... 702/104; 702/85; 702/105; 702/106; 702/107; 702/108; 702/111; 702/117; 702/118; 324/601; 324/613; 324/614; 375/227

(58) Field of Classification Search .................... 702/85, 702/104–108, 111, 117, 118; 324/601, 613, 324/614; 375/227
See application file for complete search history.

(56) References Cited

U.S. PATENT DOCUMENTS

| | | |
|---|---|---|
| 2006/0009180 A1 | 1/2006 | Xu |
| 2006/0044185 A1 | 3/2006 | Jin |
| 2006/0111050 A1 | 5/2006 | Choi |
| 2006/0291549 A1 | 12/2006 | Seppinen |

OTHER PUBLICATIONS

International Search Report issued in PCT/EP2008/054471 on Jul. 10, 2008.

*Primary Examiner* — Sujoy Kundu
(74) *Attorney, Agent, or Firm* — Vedder Price PC

(57) ABSTRACT

The invention concerns a method for determining a calibration value indicating the extent of loss of calibration of a group of three or more sensors in a sensor network, the method involving receiving a plurality of data values captured over a period of time by each of the sensors, determining by a processing unit (404) at least one correlation value associated with each sensor, each correlation value corresponding to the correlation between the data values captured by the associated sensor and the data values captured by at least one other sensor; extracting by a high pass filter (410) a noise component of the correlation values and outputting the calibration value determined based on the difference between the noise component and a reference noise value.

14 Claims, 3 Drawing Sheets

SENSOR NETWORK CALIBRATION

FIELD OF THE INVENTION

The present invention relates to circuitry for determining calibration of a group of sensors, and in particular calibration of sensors in a sensor network.

BACKGROUND OF THE INVENTION

Sensor networks comprising sensors are often used for monitoring variables in certain environments. Each sensor comprises a sensing mechanism, and a transmitter for transmitting sensed data to a base unit. If the sensors are wireless, transmission of the data is performed by a wireless transmitter.

Once sensors have been deployed in an environment, they generally have a limited lifetime. For example if sensors use a battery as their power source, the battery will eventually become discharged. Even before this however, sensors tend to lose calibration. Thus, whereas initially the data sensed by the sensors can be relied upon as being accurate, at some stage calibration is lost to such an extent that the data is no longer useful.

Replacing sensors when their readings are still accurate is wasteful and costly. On the other hand, relying on results from sensors that have lost calibration leads to inaccurate data, which can be misleading or at worst dangerous. Therefore there is a need to know how calibrated sensors are.

A problem is that the rate that the calibration of sensors in a sensor network is lost can vary depending on various factors including environmental conditions and the electronic circuitry in the sensors, and can be very difficult to predict. Thus there is a technical problem in determining the extent of calibration loss in the sensors of a sensor network.

SUMMARY OF THE INVENTION

According to one aspect of the present invention, there is provided a method for determining a calibration value indicating the extent of loss of calibration of a group of three or more sensors in a sensor network, the network preferably comprising at least some redundancy between the sensors in the group, the method comprising receiving a plurality of data values captured over a period of time by each of the sensors, determining by a processing unit at least one correlation value associated with each sensor, each correlation value corresponding to the correlation between the data values captured by the associated sensor and the data values captured by at least one other sensor, extracting by a high pass filter a noise component of the correlation values, and outputting the calibration value determined based on the difference between the noise component and a reference noise value.

According to one embodiment of the present invention, the reference noise value is determined by receiving a plurality of initial data values captured over an initial period of time by each of the sensors, determining by a processing unit at least one initial correlation value associated with each sensor, each initial correlation value corresponding to the correlation between the initial data values captured by the associated sensor and the initial data values captured by at least one other sensor and extracting by a high pass filter an initial noise component of the initial correlation values, the initial noise component providing the reference noise value.

According to one embodiment of the present invention, the method further comprises determining a plurality of groups of sensors, each group comprising at least three sensors in the sensor network, the groups being determined based on the correlation between data values captured by the sensors of the network, wherein sensors having correlated data values are grouped together.

According to one embodiment of the present invention, the method further comprises determining the calibration value for each of the group of sensors and using data values captured by the group of sensors in at least one calculation, wherein for the calculation data values from each group of sensors are weighted based on the group's associated calibration value, such that the data values from a more calibrated group of sensors is given a higher weighting that data values from a less calibrated group of sensors.

According to one embodiment of the present invention, the group comprises n sensors and the correlation values fill an n by n matrix, and wherein the noise component is extracted in the form of a further n by n matrix.

According to one embodiment of the present invention, the difference between the noise component and the reference noise value is calculated based on the norm of the noise component.

According to one embodiment of the present invention, the method further comprises comparing the calibration value with a threshold value, and when the calibration value is higher than the threshold value, outputting an indication that the group of sensors have lost calibration.

According to one embodiment of the present invention, the method further comprises replacing the group of sensors when the calibration value is greater than the threshold.

According to one embodiment of the present invention, the method further comprises recalibrating the group of sensors when the calibration value is greater than the threshold.

According to one embodiment of the present invention, the sensor network comprises at least one control function activated when at least one data value from at least one sensor is above a control threshold value, the method further comprising adjusting the control threshold value based on the calibration value.

According to another aspect of the present invention, there is provided circuitry for determining a calibration value indicating the extent of calibration loss of a group of three or more sensors in a sensor network comprising a correlation calculation unit arranged to receive a plurality of data values captured over a period of time by each of the sensors and to determine at least one correlation value associated with each sensor, each correlation value corresponding to the correlation between the data values captured by the associated sensor and the data values captured by at least one other sensor, a high pass filter arranged to extract a noise component of the correlation values and an output unit arranged to output the calibration value based on the difference between the noise component and a reference noise value.

According to one embodiment of the present invention, the circuitry further comprises a comparator for comparing the calibration value with a threshold value.

According to one embodiment of the present invention, the circuitry further comprises circuitry for deactivating the group of sensors when the calibration value is greater than the threshold.

According to a further aspect of the present invention, there is provided a sensor network comprising a plurality of groups of sensors and the above circuitry arranged to determine a calibration value one or more of the groups of sensors.

BRIEF DESCRIPTION OF THE DRAWINGS

The foregoing and other purposes, features, aspects and advantages of the invention will become apparent from the following detailed description of embodiments, given by way of illustration and not limitation with reference to the accompanying drawings, in which.

DETAILED DESCRIPTION OF THE INVENTION

Figure 1:
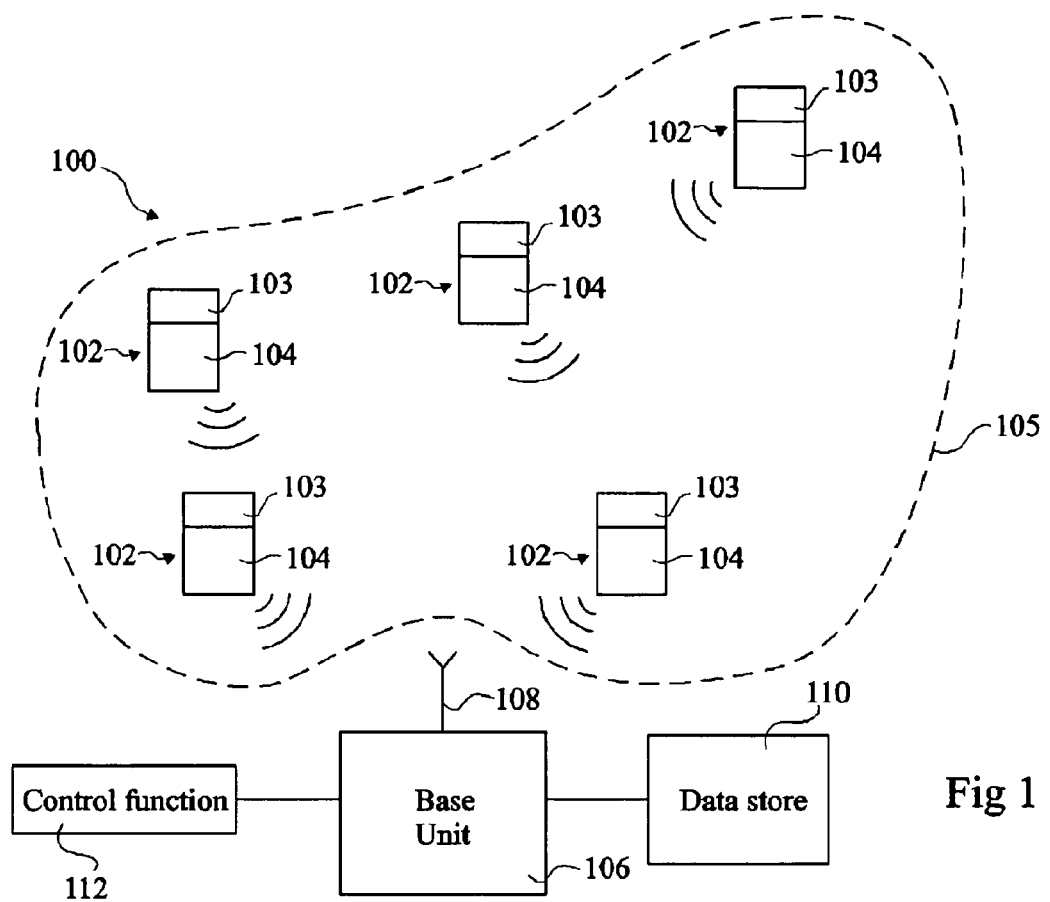
FIG. 1 illustrates schematically a sensor network according to one embodiment.

FIG. 1 illustrates a sensor network 100 comprising five wireless sensors 102, each comprising a sensing mechanism 103, and communication circuitry 104. The sensors are deployed over an area 105. A base unit 106 receives data sensed by the sensors. Sensors 102 closest to the base unit 106 wirelessly transmit data directly to the base unit, which receives the data via an aerial 108. The communication circuitry 104 in each sensor for example has a limited range, and some sensors may be out of range for transmission directly to the base unit 106. Even if they are not out of range, it may be that to conserve power, it is decided to avoid transmission over long distances. These sensors transmit their captured data to another closer sensor, which relays the data to the base unit 106. In some cases data can be relayed from the furthest sensors in a network to the base unit 106 via multiple intermediate sensors. Whilst network 100 comprises only 5 sensors, in practise such networks can include any number of sensors, and often comprise hundreds, thousands or even millions of individual sensors.

The base unit 106 stores the data received from the sensors of the sensor network in a datastore 110, from where it can for example be displayed on a user display (not shown), or subjected to further processing or analysis. In some embodiments, the base unit 106 determines when one or more conditions relating to the data are met, and actives a control function 112 in response, the control function for example corresponding to an alarm system, or some form of mechanical or electrical response system.

An example of an application of a sensor network is the use of a sensor network to detect forest fires. In such a case sensors are deployed in a forest, each comprising a temperature sensor to detect temperature levels. In this case, the control function 112 is for example an alarm system which is activated when a sensor reads a relatively high temperature value corresponding to a forest fire. Alternative examples include pH sensors, for example deployed on farming land, pressure sensors for example deployed in an aircraft, conductivity or dissolved oxygen sensors, for example deployed in the sea, chemical sensors for example deployed on an oil line to detect leaks, or vibration sensors for example deployed on a bridge.

Figure 2:
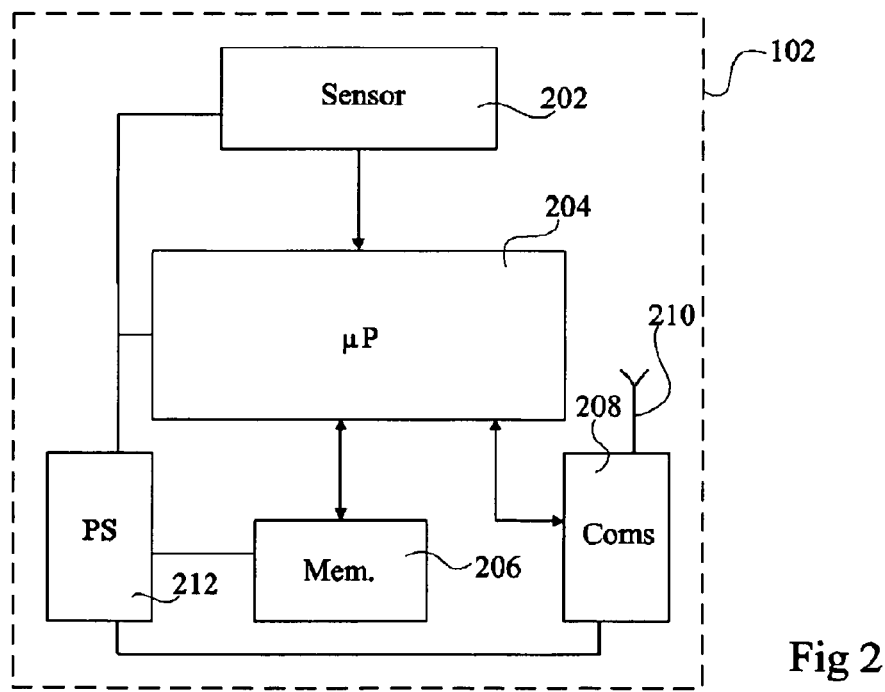
FIG. 2 illustrates schematically an embodiment of an individual sensor of a sensor network.

FIG. 2 illustrates schematically an example of the functional blocks of a sensor 102 in more detail. In particular, the sensor comprises a sensor mechanism 202 that senses one or more variables in the sensor's environment as explained above, for example temperature, humidity, pressure, vibrations, chemicals, oxygen, conductivity, noise levels, smoke, gas, etc. Such sensor mechanisms generally provide an output in the form of a voltage or current level that corresponds to the level of the sensed variable. The frequency that the sensor mechanism outputs the currently sensed value will depend on the particular application, and could range for example from thousands of readings per second to only a few reading per day or month.

The sensor 102 also comprises a microprocessor 204, which receives the data signals from the sensor 202. The sensor 102 further comprises a memory 206 connected to the microprocessor 204 where data captured by the sensor 202 is for example stored prior to being transmitted. The microprocessor 204 is connected a communications block 208, which transmits or receives data to or from other sensors 102 or base unit 106. Data is for example transmitted using the Zigbee standard. Data received from another sensor which is to be relayed to the base station 106 is for example temporarily stored in memory 206.

A power supply 212 provides power to the device, and in particular to the sensor mechanism 202, the microprocessor 204, the memory 206, and the communications block 208. Although not illustrated, power generation mean may also be provided in the sensor which takes power from the sensor's environment, for example from solar energy or vibrations. This can extend the lifetime of the sensor's power source.

The output of the sensing mechanism 202 is likely to lose calibration over time. This can be due to impacts received by the sensor, corrosion of the sensor, or more often due to the electronics in the sensor, which can comprise many transistor gates affected by aging, temperature variations, etc. It has been found that the loss of calibration is generally random in each sensor, and the direction of drift also generally unique to each sensor. For example, sensor drift affecting various types of sensors is described in detail in document titled "Getting the Highest Accuracy Data", module 7 of the seabird tutorials, by Ocean Teacher. The fact that calibration loss is different in each sensor makes it very difficult to distinguish between data variations caused by loss of calibration, or a legitimate change in the sensor's environment.

Figure 3:
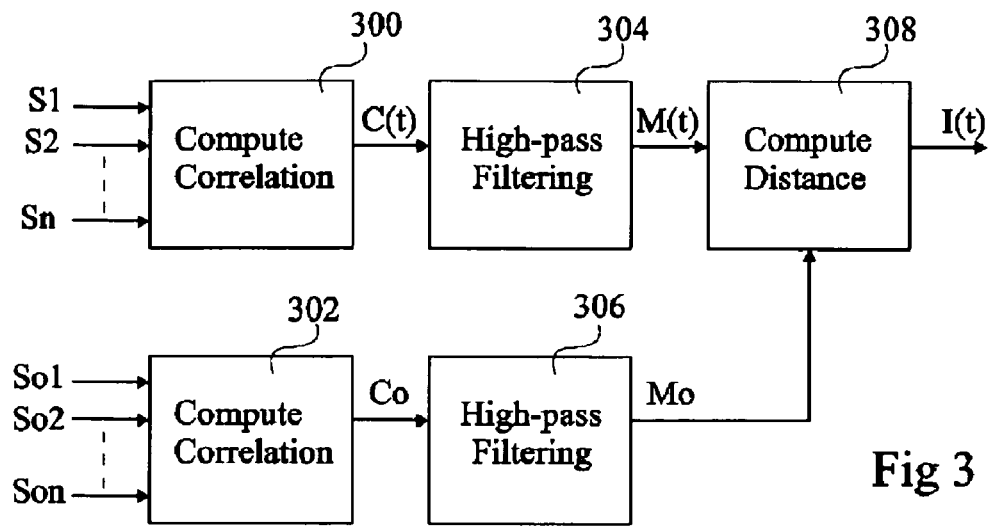
FIG. 3 illustrates method steps in determining the calibration of a group of sensors in a sensor network according to an embodiment of the present invention.

FIG. 3 will now be referred to for describing a method of determining calibration loss of a group of sensors S1 to Sn in a sensor network, where n is at least three. In other words there are at least three sensors in the group.

The group of sensors of the sensor network are assumed to be sufficiently dense that there is at least some redundancy, on other words there is at least some correlation between the data values received by the sensors. For example, sensors are sufficiently close that an environmental change affecting one sensor is likely to also effect at least one other sensor in the network.

As shown in FIG. 3, in a step 300, the correlation between data values S1 to Sn from sensors $S_1$ to $S_n$ is computed. The correlation relates to a plurality of sensor readings over a period of time t. Thus a number of consecutive data values are received from each sensor in the group of sensors. The number of data values could be anything from two or three values to hundreds or thousands of values. Correlation is computed between pairs of sensors. In particular, a correlation value is preferably computed relating to the data values received from each sensor in the group and at least one other sensor in the group. Thus at least one correlation value is provided involving data from each sensor in the group. In preferred embodiments however, correlation is computed between data values from each sensor with respect to each other sensor. Thus assuming n sensors, the results preferably fill an n by n matrix as follows, where $C_{i,j}(t)$ is the correlation between the data values received from sensors $S_i$ and $S_j$ over a time period t, where i and j range from 1 to n:

$$\begin{matrix} C_{1,1}(t) & C_{1,2}(t) & C_{1,3}(t) & -- & C_{1,n}(t) \\ C_{2,1}(t) & C_{2,2}(t) & C_{2,3}(t) & -- & C_{2,n}(t) \\ C_{3,1}(t) & C_{3,2}(t) & C_{3,3}(t) & -- & C_{3,n}(t) \\ | & | & | & & | \\ | & | & | & & | \\ C_{n,1}(t) & C_{n,2}(t) & C_{n,3}(t) & -- & C_{n,n}(t) \end{matrix}$$

Given that $C_{1,2}(t)$ is equal to $C_{2,1}(t)$, it is only actually necessary to do this calculation once, and likewise for the other pairs of values in the matrix. Furthermore, as explained above, it is not necessary to determine all of the values in the matrix.

Determining the correlation between two sets of data values is well known, and for example can be calculated based on the following formula:

$$C_{i,j}(t) = (E[(S_i(t)-\mu_i)(S_j(t)-\mu_j)])/(E[(S_i(t)-\mu_i)^2]E[(S_j(t)-\mu_j)^2])^{1/2}$$

where $E[\ ]$ is the expectation, $\mu_i$ is the expectation of $S_i$ and $\mu_j$ is the expectation of $S_j$. Applying this formula results in correlation values between $-1$ and $1$, where $-1$ implies exact inverse correlation, $0$ implies no correlation, and $1$ implies exact correlation.

The correlation $C(t)$ at a certain time can be separated into components as follows:

$$C(t)=C_0+E(t)+M(t)$$

where $C_0$ is an initial correlation value between the data values, which for example, corresponds to correlation between the data values when the sensors are correctly calibrated, $E(t)$ is a structured correlation variation, for example resulting from changes in the environment affecting only some of the sensors, and $M(t)$ is a random correlation component, resulting from loss of calibration of the sensors. This later component can be considered as a noise component.

As illustrated in FIG. 3, the method comprises a step 302 in which an initial correlation value $C_0$ is determined based on a number of consecutive values of initial sensor data readings $S_{01}$ to $S_{0n}$. This is calculated in the same way as for the computation at step 300, and for example uses the above formula for $C_{i,j}(t)$.

According to the present method, in a step 304, the noise component is extracted from the correlation $C(t)$ calculated in step 300. For doing this, it is for example assumed that the noise component results from white noise, which best corresponds to the form of calibration loss in most cases, although in alternative embodiments other forms of noise models could be used. The noise component is extracted using a high-pass filter applied to the correlation matrix, for example according to principle component analysis (PCA). Principle component analysis is a matrix decomposition technique which is used to separate high and low frequency components of any matrix. In particular, PCA allows a data set to be simplified, by reducing multidimensional data sets to lower dimensions for analysis. PCA is an orthogonal linear transformation that used to transform data to a new co-ordinate system such that the greatest variance by any projection of the data comes to lie on the first co-ordinate, referred to as the first principle component, the second greatest variance on the second co-ordinate, and so on. PCA can be used for dimensionality reduction in a data set while retaining the characteristics of the data set that contribute most to its variance, by keeping lower-order principle components, and ignoring higher-order ones.

Techniques for determining a noise component using PCA are known in the art. However, known techniques are generally applied to remove the noise component rather than to keep the noise component. For example, technical paper titled "Kernel PCA and De-Noising in Feature Spaces", Sebastian Mika et al., which is hereby incorporated by reference to the extent allowable by the law, describes techniques for determining and removing noise using principle component analysis. Also, document titled "Robust Denoising by Kernal PCA", ICANN 2002, international conference, Madrid, Spain, Aug. 28-30, 2002, which is hereby incorporated by reference to the extent allowable by the law, also discusses such techniques.

Step 304 comprises using such techniques to determine the noise component, and rather than removing this component from a signal, keeping the noise component and removing the rest. An example of Matlab code for determining the noise component of a matrix according to one embodiment of the present invention is provided overleaf.

MATLAB Code Example:

```
Function
 [EOFs,PCs,Var,Xrecon]=principal_component_analysis(X,neof)
% function [EOFs,PCs,Var]=principal_component_analysis(X,neof)
% Function to do a principal component analysis of
% data matrix X.
% Input:
%    X: (t,x) each row corrsponds to a sample, each column
%    is a variable. (Each column is a time series of a variable.)
%    neof: number of EOF/PC to return
% Output:
%    EOFs:  (x,e) matrix with EOFs (loadings) in the columns
%    PCs:   (t,e) matrix with principal components in columns
%    Var:   variance of each principal component
%    Xrecon: (t,x) reconstructed X (WITHOUT adding back the mean)
% To reconstruct: Xrecon = PCs*EOFs'
% Notes: (1) This routine will subtract off the mean of each
%            variable (column) before performing PCA.
%        (2) sum(var(X)) = sum(Var) = sum(diag(S)^2/(m-1))
if strcmp(class(X), 'single')
   disp('WARNING: Converting input matrix X to class DOUBLE')
end
% Center X by subtracting off column means
[m,n] = size(X);
X = X - repmat(mean(X,1),m,1);
r = min(m-1,n); % max possible rank of X
% SVD
if nargin < 2
      [U,S,EOFs]=svds(X,r);
else
      [U,S,EOFs]=svds(X,min(r,neof));
end
% EOFs: (x,e)
% U: (t,e)
% Determine the EOF coefficients
PCs=U*S; % PCs=X*EOFs (t,e)
% compute variance of each PC
Var=diag(S).^2/(m-1);
% Note: X = U*S*EOFs'
%       EOFs are eigenvectors of X'*X = (m-1)*cov(X)
%       sig^2 (=diag(S)^2) are eigenvalues of X'*X
%       So tr(X'*X) = sum(sig_i^2) = (m-1)*(total variance of X)
if nargout>3
   Xrecon = PCs*EOFs'; % (t,x)
end
```

The high-pass filtering step will correspond to a cut-off frequency below which the signal is discarded. The cut-off frequency will depend on various factors in the environment. An optimal cut-off frequency can for example be determined heuristically.

Thus step 304 results in a further matrix $M(t)$ which represents the noise component extracted from the correlation matrix.

In step 306, the same noise extraction method is performed on the initial correlation value, $C_0$. This provides an initial noise component $M_0$, which indicates an initial noise level.

An indication of calibration loss I(t) is determined based on a comparison between the initial noise component matrix $M_0$ and the current noise component matrix M(t). In particular, this is preferably determined in step 308 as the distance between noise component M(t) and initial noise component $M_0$(t), in other words:

$$I(t)=d(M0,M(t))=\|M(t)-M_0\|$$

where $\|M(t)-M_0\|$ is the norm of $M(t)-M_0$, and provides a scalar value as the calibration value I(t). This norm is for example the Frobenius norm, and can be calculated as:

$$\Sigma_{i,j}(M_{i,j}(0)-M_{i,j}(t))^2$$

By defining I(t) as the difference between the noise component M(t) and the initial component $M_0$, a higher calibration value indicates less calibration, whereas a lower calibration indicates higher calibration of the group of sensors.

Figure 4:
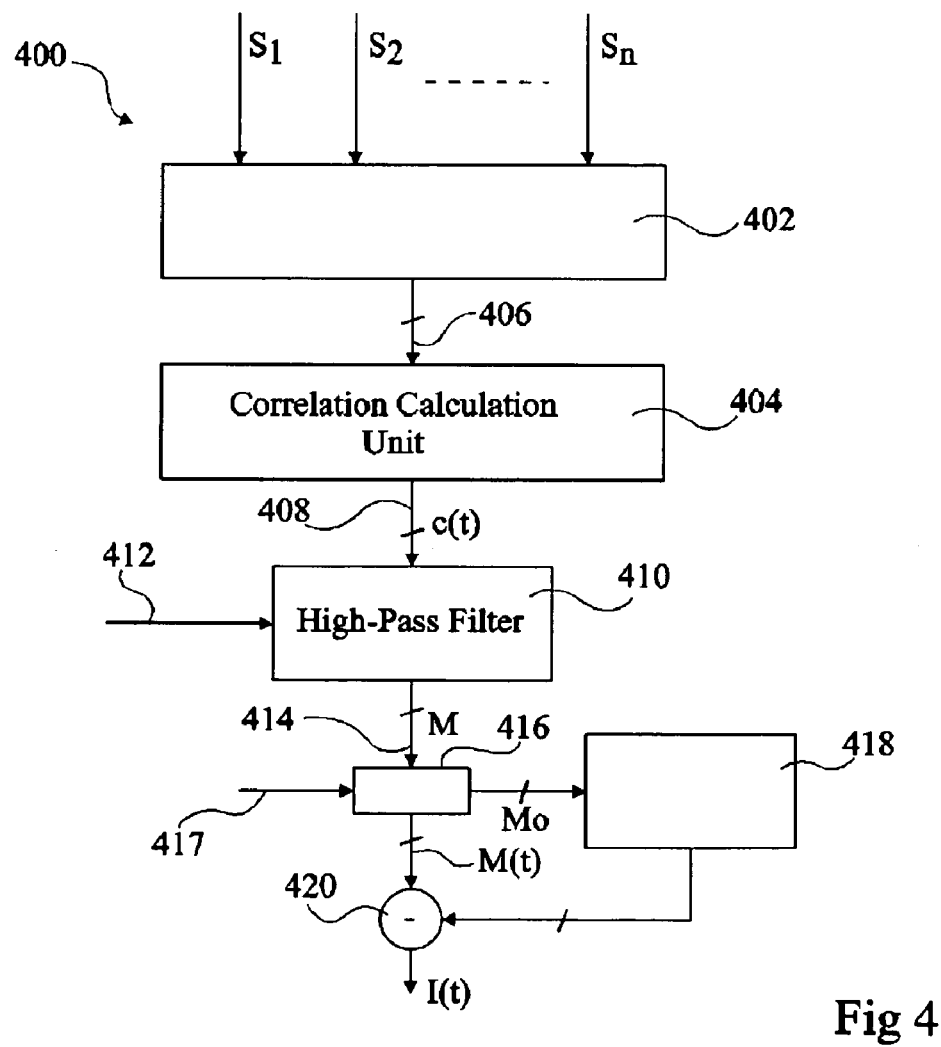
FIG. 4 illustrates schematically circuitry for determining the extent of calibration loss of a group of sensors according to an embodiment of the present invention.

FIG. 4 illustrates schematically circuitry 400 for determining the extent of calibration loss of a group of sensors in a sensor network.

A buffer or memory block 402 receives data values from sensors $S_1$ to $S_n$ in the network. Buffer 402 is preferably large enough to store a number of consecutive data values recorded by the sensor network over a period of time. As an example, it receives and stores twenty consecutive data values from each sensor over a period of one day. Such data could represent initial data used for calculating $M_0$, or data values for determining the calibration value I(t).

Buffer block 402 is connected to a correlation calculation unit 404 by a parallel connection 406 or alternatively a serial connection. As described above, the correlation calculation unit 404 determines the correlation $C_{i,j}(t)$, based on the data values from pairs of sensors. The corresponding correlations C(t) are output to a high-pass filter 410, which extracts the noise component, based on a cut-off frequency, for example pre-programmed, or indicated by a control signal on input 412.

The extracted noise component matrix M is output on output 414 to a switch 416. If this matrix corresponds to an initial noise component value $M_0$, it is routed by switch 416 to a memory 418 where it is subsequently accessible. If the extracted noise component matrix is to be used for a calibration calculation, it is provided by switch 416 to a subtract block 420, which subtracts the initial noise component $M_0$ from the current noise component M(t) and determines the norm as described above, to determine the extend of calibration loss as a scalar value I(t). Switch 416 is for example controlled by an input 417 indicating whether the noise value is an initial value, or a value to be used to calculate a calibration value.

It will be apparent to those skilled in the art that the circuitry of FIG. 4 can be implemented entirely by hardware, by software, or a combination of both.

Figure 5:
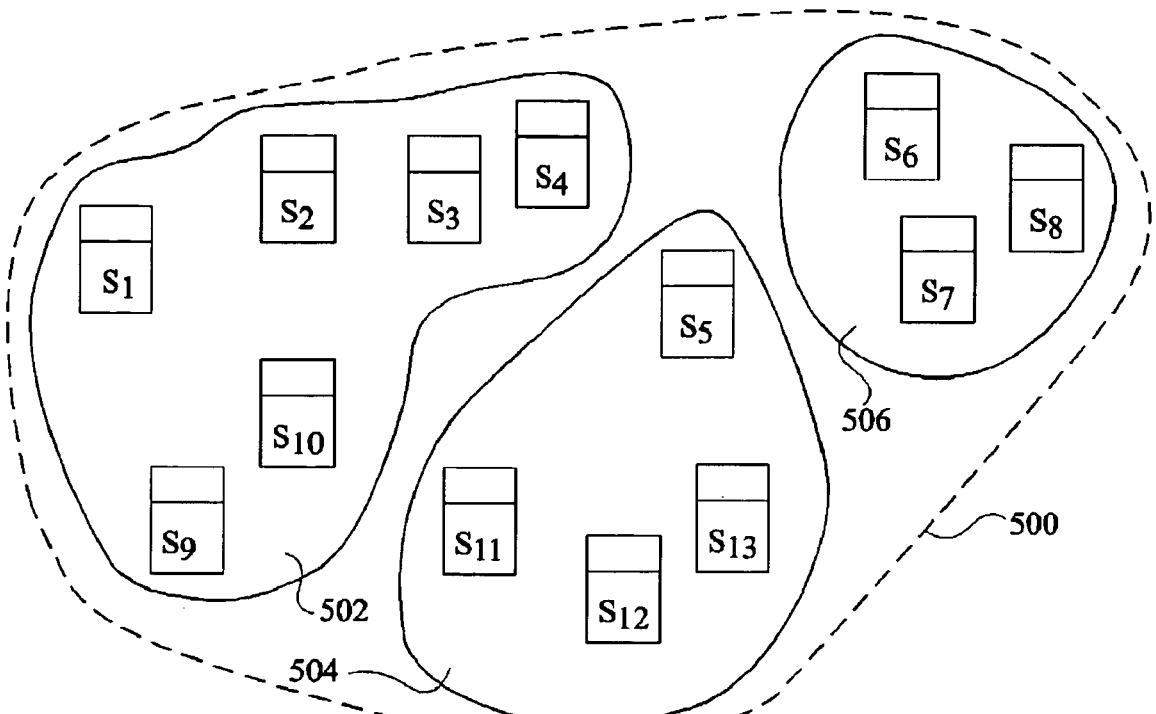
FIG. 5 illustrates sensors of a sensor network divided into groups of sensors according to one embodiment of the present invention.

FIG. 5 illustrates sensors in a sensor network that have been grouped for determining the calibration value.

In particular, the above method and circuitry is most useful when the sensors in the group of sensors show high correlation with each other. Thus in networks in which some groups of sensors are more correlated than others, it is preferable to first divide the sensors of the network into such groups before calculating a calibration value for each group individually. This also has the advantage that if certain groups of sensors lose calibration faster than other groups, it can be determined that only some of the sensors need replacing or recalibrating.

As illustrated in FIG. 5, sensors deployed over an area 500 are divided into three groups 502, 504 and 506 respectively. Group 502 comprises six sensors, $S_1$ to $S_4$, $S_9$ and $S_{10}$, group 504 comprises four sensors, $S_5$ and $S_{11}$ to $S_{13}$, while group 506 comprises three sensors, $S_6$ to $S_8$. The groups are for example defined by physical factors, for example grouping all the sensors in a room together, or grouping sensors that are physically close together. Alternatively, groups are defined by taking a series of initial readings and determining which sensors show the best correlation with each other. While for meaningful results the groups comprise at least three sensors, as a general rule, the more sensors in each group, the better the calibration indication will be, as a greater number of results makes it easier to determine and extract only noise components from the correlation values.

The calibration value I(t) determined for a group of sensors can be used in a number of ways. In some embodiments, the value is used to give a weight to the data values captured by that group of sensors. Thus where data is used from multiple sensor groups, data from less calibrated groups of sensors can be given less weight, and data from more calibrated groups more weight, thus improving the accuracy of the data.

Alternatively, a threshold value for the calibration value can be chosen such that if the calibration value I(t) is above this value, the data from those sensors is disregarded. Additionally or alternatively, these sensors could be replaced, or recalibrated.

In some cases, as described above, a control function (such as function 112 in FIG. 1) can be implemented based on the results recorded by the sensor network. Such control functions are for example implemented if data from one or more sensors reaches a threshold. An example would be activating a fire alarm if a sensor reads more than 200° C. According to some embodiments, the calibration value is used to adjust this threshold value. Thus as sensors become less calibrated, the threshold is for example increased, making a false activation less likely.

Thus a method and circuitry for determining the extent of calibration loss of a group of sensors in a sensor network has been described. The method involves determining correlations between pairs of sensors in the group. This is achieved by determining the correlation between a plurality of data values from each sensor in the group with data values from at least one other sensor in the group, and preferably all of the other sensors in the group. A noise component is then extracted from the correlation values by applying a high-pass filter. The difference between this noise component value and an initial noise value determines the extent of calibration loss of the sensors in the time interval since the initial noise value was recorded. Thus the initial noise value is preferably calculated at a time when the sensors are correctly calibrated.

An advantage of this method and circuitry is that it allows an accurate determination of when data captured by sensors in a group is reliable. By using a correlation value between the data values, environmental variations can advantageously be removed when determining the calibration loss. The calibration value can then be used to determine when to recalibrate or replace sensors and when data from the sensors can be or can not be used.

The sensors in a network are preferably divided into groups for determining the calibration value. This has the advantage that sensors that take longer to lose calibration can be used for longer, whereas groups of sensors that quickly lose calibration can be deactivated, in other words their data ignored, sooner, such that the accuracy of data from the network is improved.

Having thus described at least one illustrative embodiment of the invention, various alterations, modifications and improvements will readily occur to those skilled in the art.

For example, while examples of a sensor network and a sensor have been provided in FIGS. 1 and 2 respectively, the present application can be applied to a great variety of sensor networks and sensors, which may or may not be wireless.

While an example of a high-pass filtering step applied to the correlation matrix based on PCA has been provided, any suitable algorithm could be used to provide the function of a high-pass filter on the correlation matrix.

Furthermore, while it has been described above that matrices are used for the calculations, it will be apparent to those skilled in the art that the data can be processed in different forms. While the initial noise component has been described as being in the form of a matrix $M_0$, this value could be provided as a scalar value, and subtracted directly from the values in the noise component matrix $M(t)$ to generate the calibration value $I(t)$.

Such alterations, modifications and improvements are intended to be within the scope of the invention. Accordingly, the foregoing description is by way of example only and is not intended to be limiting. The invention is limited only as defined in the following claims and the equivalent thereto.

The invention claimed is:

1. A method for determining a calibration value indicating the extent of loss of calibration of a group of three or more sensors in a sensor network comprising:
   receiving a plurality of data values captured over a period of time by each of said sensors;
   determining by a processing unit at least one correlation value associated with each sensor, each correlation value corresponding to the correlation between the data values captured by the associated sensor and the data values captured by at least one other sensor;
   extracting by a high pass filter a noise component of said correlation values; and
   outputting said calibration value determined based on the difference between said noise component and a reference noise value.

2. The method of claim 1, wherein said reference noise value is determined by steps comprising:
   receiving a plurality of initial data values captured over an initial period of time by each of said sensors;
   determining by a processing unit at least one initial correlation value associated with each sensor, each initial correlation value corresponding to the correlation between the initial data values captured by the associated sensor and the initial data values captured by at least one other sensor; and
   extracting by a high pass filter an initial noise component of said initial correlation values, said initial noise component providing said reference noise value.

3. The method of claim 1, further comprising determining a plurality of groups of sensors, each group comprising at least three sensors in said sensor network, said groups being determined based on the correlation between data values captured by the sensors of the network, wherein sensors having correlated data values are grouped together.

4. The method of claim 3, further comprising determining said calibration value for each of said group of sensors; and using data values captured by said group of sensors in at least one calculation, wherein for the purposes of said calculation, data values from each group of sensors are weighted based on the calibration value associated with that group, such that the data values from a more calibrated group of sensors is given a higher weighting that data values from a less calibrated group of sensors.

5. The method of claim 1, wherein said group comprises n sensors and said correlation values fill an n by n matrix, and wherein said noise component is extracted in the form of a further n by n matrix.

6. The method of claim 5, wherein the calibration value $I(t)$ defined as the difference between said noise component and said reference noise value is calculated based on the following formula:

$$I(t)=\|M(t)-M0\|$$

where $M(t)$ is the noise component in matrix form, $M0$ is the initial noise value in matrix form, and $\|M(t)-M0\|$ is the norm of $M(t)-M0$.

7. The method of claim 1, further comprising comparing said calibration value with a threshold value, and when said calibration value is higher than said threshold value, outputting an indication that said group of sensors have lost calibration.

8. The method of claim 7, further comprising replacing said group of sensors when said calibration value is greater than said threshold.

9. The method of claim 7, further comprising recalibrating said group of sensors when said calibration value is greater than said threshold.

10. The method of claim 1, wherein said sensor network comprises at least one control function activated when at least one data value from at least one sensor is above a control threshold value, the method further comprising adjusting said control threshold value based on said calibration value.

11. Circuitry for determining a calibration value indicating the extent of calibration loss of a group of three or more sensors in a sensor network comprising:
    a correlation calculation unit arranged to receive a plurality of data values captured over a period of time by each of said sensors and to determine at least one correlation value associated with each sensor, each correlation value corresponding to the correlation between the data values captured by the associated sensor and the data values captured by at least one other sensor;
    a high pass filter arranged to extract a noise component of said correlation values; and
    an output unit arranged to output said calibration value based on the difference between said noise component and a reference noise value.

12. The circuitry of claim 11, further comprising a comparator for comparing said calibration value with a threshold value.

13. The circuitry of claim 12, further comprising circuitry for deactivating said group of sensors when said calibration value is greater than said threshold.

14. A sensor network comprising a plurality of groups of sensors and the circuitry of claim 11 arranged to determine a calibration value for one or more of said groups of sensors.

* * * * *